Oct. 20, 1970     R. W. KITCHIN     3,535,488
TRACER BEAM METHOD OF PROOFING ELECTRON BEAM WELD PATH
Filed July 13, 1967
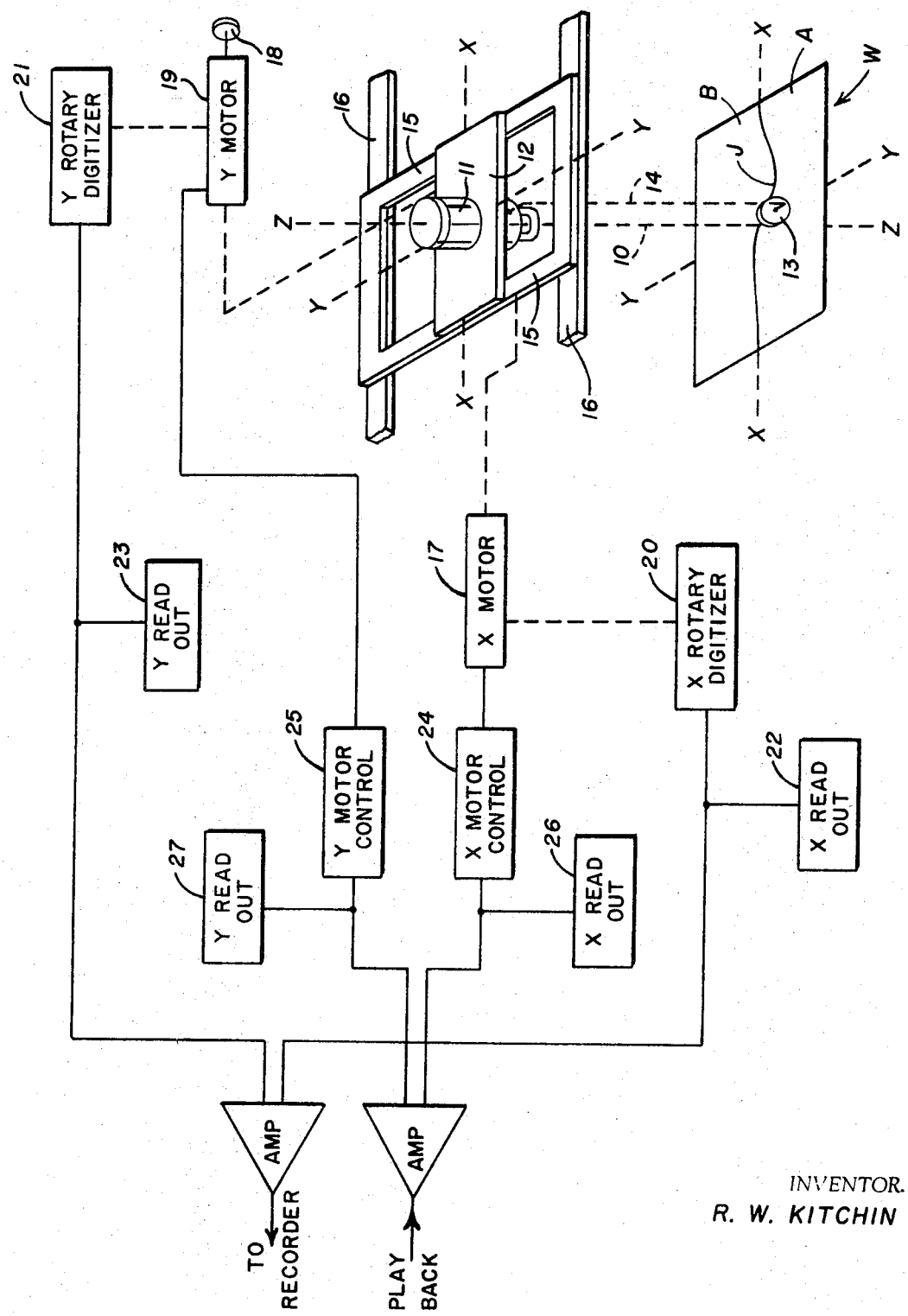
INVENTOR.
R. W. KITCHIN United States Patent Office 3,535,488
Patented Oct. 20, 1970

3,535,488
TRACER BEAM METHOD OF PROOFING
ELECTRON BEAM WELD PATH
Robert W. Kitchin, San Diego, Calif., assignor to
Rohr Corporation, a corporation of Delaware
Filed July 13, 1967, Ser. No. 653,117
Int. Cl. B23k 15/00
U.S. Cl. 219—121                  3 Claims

ABSTRACT OF THE DISCLOSURE

Tracer beam techniques, applicable to electron beam welding, provide a method by which a very fine beam of electrons, emitted by the electron gun, traces and proofs the weld pass prior to the actual welding operation. These techniques also provide for the accurate and repeatable focusing of the beam and the detection of electrostatic or magnetic fields which tend spuriously to deflect the beam from the desired weld path.

STATE OF THE PRIOR ART (BACKGROUND)

Heretofore, in preparing a proposed weld path for welding by means of an electron beam, the weld path is "proofed" by making a series of tack welds along the weld path, using a beam that has been focused on a target adjacent to the work. This has the disadvantage that if the same power is used for tacking as for welding, unwanted heat is generated in the part, and the deep tacks are sometimes difficult to cover with the succeeding weld pass. Moreover, if the first pass of tack welds indicates that the beam position does not coincide with the C/L (center line) of the desired weld path, another tack weld pass is necessary. This induces more heat in the part and produces a wider tacked area to cover with the weld pass. According to another method currently used, a lower power setting is utilized to make the tack welds. This is usually done at a different voltage, and requires re-focusing of the beam and time-consuming adjustments.

With respect to prior art focusing procedures, manufacturers of electron beam welding equipment generally prescribe focusing of the beam at the welding power parameters. This procedure, however, when attempted at moderate or high power, makes accurate and repeatable focusing an operation requiring a considerable degree of skill and experience. This is because the beam is so bright and intense, it is difficult to determine when it reaches an "in-focus" condition. The difficulty is comparable to that of adjusting two high amplitude sound sources to a null point. Just as the human ear has great difficulty in determining small differences in high amplitude sounds, the eye experiences the same difficulty in differentiating between small differences in brilliant and concentrate light sources. In addition, this ability to differentiate varies from person to person.

THE PRESENT INVENTION

In accordance with the method of the present invention for "proofing" a weld path, a "tracer beam" is caused to traverse along the weld path, and its presence therealong is detectable visually as a tiny spot of light that is the actual beam itself. This illumination of the workpiece, at low beam current, while being fully sufficient to trace or "proof" the weld path, is insufficient to affect the surface of the workpiece.

Essentially, the "tracer beam" is a very low energy electron beam, obtained by reducing filament emission of the electron gun to a minimum value so that beam current is barley perceptible on the meter. The "tracer beam" is always used at the voltage developed (per the welding schedule) for making the actual weld. The beam voltage in commercially used electron beam welding systems is fixed, that is, is held constant either by automatic regulation or by manual control, at the value used for welding.

The "tracer beam" thus permits proofing of the weld path with relatively little preheating effect which leaves no impression on the workpiece. If the "tracer beam" shows that the beam does not coincide with the C/L of the weld path, moreover, either the electron gun or the workpiece can be moved to correct this condition without requiring that the beam be turned off. This makes alignment much simpler and less time-consuming.

The low intensity "tracer beam" has a further advantage in that it will respond to spurious magnetic fields which lie along the weld path. These magnetic fields will deflect the beam path and will indicate to the operator a need for taking corrective action to obviate the causes of such spurious deflections.

Since beam focus is a function of voltage, rather than current, the "tracer beam" method also provides as a secondary benefit, an accurate and repeatable means of focusing the beam without the usual problems of human error such as are attributable, for example, to inabiliy to distinguish differences in beam spot diameter due to excessive brightness and intensity of light, and submergence of the molten puddle below the surface of the target due to heat.

By utilizing a low energy beam as featured in this invention, the difference between "in-focus" and "out-of-focus" conditions is readily recognized. The beam completely disappears when out-of-focus. When the beam is in-focus, however, it is a thin pin-point of light on the workpiece and is easily detected.

OBJECTS

An object of the invention is to provide a new and improved electron beam welding method of locating the beam accurately to trace the C/L of the weld path.

Another object is to provide a method of tracing the weld path with the beam itself operated at reduced beam current resulting in a beam so small and so low in power that it is barley visible on the workpiece and does not leave a mark thereon.

Another object is to provide a tracer beam method in which the tracer beam is operable at the welding voltage to simplify focusing of the beam and to render such operations more accurate and repeatable.

Still another object in a tracer beam method is to detect spurious magnetic fields which tend to deflect the tracer beam from the weld path.

Still other objects, features and advantages of the present invention will become more fully understood as the description proceeds with reference to the accompanying drawing wherein:

BRIEF DESCRIPTION OF THE DRAWING

The single figure diagrammatically discloses a system for practicing the tracer beam method.

SPECIFICATION

In the drawing, a metal workpiece W comprises two pieces A and B which are to be electron beam welded along the joint J which defines a weld path therebetween. The weld is to be performed by the electron beam 10 which emanates from the electron gun 11. The gun is adjustably mounted on a crossfeed support 12 for movement along the Z—Z axis which extends in axial alignment with the beam 10. A small stylus wheel or roller 13 which engages the workpiece surface and moves alongside the butt joint J has an operative connection 14 with gun 11 and causes the gun to rise and fall with any contour in the workpiece which is encountered by the wheel as it moves along the butt joint. The beam is thus maintained in focus at the joint notwithstanding any contour in the workpiece.

The crossfeed support 12 is slidably supported on a carriage 15 for movement along the Y—Y axis which is also identified in relation to the workpiece W and the stylus wheel or roller 13. The carriage is slidably supported on the spaced members 16—16 for movement along the X—X axis which is also identified in relation to the workpiece and its engaging roller 13. Supports 16 are adjustably secured in a high vacuum chamber (not shown) which encloses the gun 11 and its slide supports 12 and 15. The workpiece may also be enclosed in the vacuum chamber when the dimensions of the workpiece are relatively small. When the workpiece is too large to be enclosed within the high vacuum chamber, the arrangement may be such as disclosed, for example, in the copending application of Milan E. Gerard for Adaptor Type Electron Beam Welding Apparatus, Ser. No. 650,069, filed June 29, 1967.

In accordance with this adaptor chamber arrangement, adaptor and low vaccum backup chambers fit opposite sides of the workpiec to enclose the butt joint region to be electron beam welded, and the high vacuum chamber mounts on the adaptor chamber in releasably sealed engagement therewith. The high vacuum chamber mounts a diffusion pump array and provides for operation of the electron beam gun along the X, Y and Z axes from a sliding voltage pickoff. Another (outside the high vacuum chamber) arrangement for welding butt joints, in this instance selected sections of a T-section framework too large for enclosre in its entirety with the high vacuum chamber, is disclosed in the copending application of Milan E. Gerard for Apply Type E.B. Welding Apparatus, Ser. No. 604,852, filed Dec. 29, 1966. Reference may be had to these applications for further description with respect to mounting arrangements and operating procedures, particularly to patent application Ser. No. 605,802 for details of construction and operation of the gun mounting mechanism.

The electron gun 11 may be of any type suitable for the purpose such, for example, as the commercially available Sciaky and Brad Thompson guns.

Locating the beam 10 accurately to track the C/L of the weld joint J can be a serious problem, particularly with the moving gun 11. The moving gun and its mount tend to block the field of view of the gun chamber view ports and do not allow a sufficient view of the beam impingement point on the workpiece to avoid the need for making repeated passes of the tack welds. The use of full power tack welds (normally the technique used to locate the beam relative to the weld joint with the Sciaky welder) in many instances therefore cannot be used without causing deep tacks which cannot be covered with the succeeding weld pass.

Focusing of the beam heretofore has also been a problem and has been accomplished with difficulty at the welding power, usually on a heavy block of copper. Copper was used simply because its high heat conductivity allows the operator to turn the beam on at high power in a stationary mode without penetrating through the copper and damaging the tooling (or chamber) underneath. However, if the beam remains on the one spot long enough, it will drill a hole through the copper. Also, the heavy vapors and outgassing given off by the copper causes frequent gun arc-outs at high power. These problems tend to make careful focusing of the beam difficult, if not impossible.

These beam locating, tracking and focusing problems are largely obviated by the tracer beam method of the present invention. This method basically uses the beam operated at the welding voltage to trace the actual weld path, but with the beam current reduced by reduction of the filament emission of the electron gun to less than 5 ma. (usually about 1 ma. at 45 kv., and slightly higher at lower voltages) so that the beam is barely visible on the workpiece. In fact, the tracer beam is so small and so low in power of the order of 45 watts that it does not leave a mark on the surface of the part. Since magnetic fields have more effect on a low energy beam, the tracer beam will detect spurious magnetic fields which, if present in the workpiece or fixturing, would tend to deflect the beam as it traces the weld path, and these disturbances can be eliminated before the actual weld traverse is begun.

Since focus current is a function of beam voltage rather than beam current, and since the tracer beam is operated at the welding voltage (as per the welding schedule for making the actual weld), focusing of the beam is advantageously achieved using the low energy tracer beam.

The "tracer beam" method comprises the following steps described with reference, for example, to the Sciaky power supply which has an automatic voltage regulator and is ideally suited for practicing the method.

STEPS (Generally stated)

(1) Adjust the high voltage control to the welding schedule value.

(2) Turn on the high voltage, the filament being off.

(3) Turn the filament on and adjust the filament current to increase the beam current from the lowest value to about 2 ma.

(4) With the beam current set at 2 ma., adjust the focus for the smallest and brightest spot.

(5) Re-adjust the filament current to get the smallest spot that will be visible without marking the workpiece. Parent metal should be used for a focus target, intially, until skill is developed, then the surface of the workpiece itself can be used for focusing.

(6) Trace the weld path.

(7) Look for any beam deflection and correct the cause.

(8) Set the filament current for normal beam welding current.

(9) Make the weld pass to complete the welding operation.

STEPS (With reference to Sciaky power supply)

(1) Set the selected welding voltage.

(2) At the selected welding voltage, i.e., 30 kv., with filament switch "ON," and with the filament Variac control full counterclockwise, slowly rotate the control clockwise while watching the beam current meter. The meter switches should be set in their lowest positions, namely, "XI" and "Divide by 10." With this switch combination, full scale on the meter is 25 ma.

(3) Increase the filament current until the beam current meter starts to indicate. The gun should be positioned on a target plate placed at the desired level for focusing. For this puropse, the plate can be a small piece of thin gage stainless steel or titanium.

(4) When the beam current meter reads about 2.5 ma., adjust the focus control to bring the beam into focus on the target. If the beam starts to melt the surface of the target, reduce the filament control slightly. Now the gun or the worktable can be moved to bring the workpiece under the beam.

(5) An optical system including a cross hair reticle should be used to obtain precise focus and to locate the beam to coincide with the weld path. Now "trace" the weld path slowly with the beam to check alignment and the presence of possible magnetic fields. If the beam appears to "wander" as the gun or worktable is moved, this is an indication of the presence of magnetic fields, and they should be eliminated before proceeding with the welding operation. In most cases, demagnetizing of the fixture and weld assembly should correct this.

(6) During the tracer pass, monitor the filament current continuously to prevent beam current from rising to a value that will melt the surface of the workpiece.

(7) Upon completion of the tracer pass and when ready to perform the actual welding operation, move the gun or the worktable to center the beam over the run-on tab or block, turn the beam off by switching off the beam voltage.

In actual operation, the workpiece and fixturing normally is demagnetized prior to setting up the equipment to make tracer beam and welding passes so that the aforementioned tendency of the beam to wander is largely obviated. Thus, when so set up relative to the workpiece W, for example, and with further reference to the drawing, the operator makes a normally uninterrupted tracer beam traverse of the weld path J with the X motor 17 set at a slow speed and by manually moving the crossfeed 12 along the Y—Y axis by adjustment, as required, of the manual control knob 18 which is operatively connected to the shaft of the Y motor 19, the stylus roller 13, as aforedescribed, maintaining the gun 11 at the appropriate distance from the workpiece for proper focus of the beam 10 on the workpiece.

As the beam 10 thus traces the joint J at low energy, rotary digitizers 20 and 21, respectively coupled operatively to the X and Y motors, produce pulses for every increment of rotational motion of the motors to move their respective carriage 15 and crossfeed 12. These pulses are suitably amplified and recorded, as indicated, and the actual incremental positions are indicated by the respective X and Y readouts 22 and 23.

On playback, the recorded X and Y information is suitably amplified and directed to the respective X and Y motor controls 24 and 25. Read out of the control pulses, and therefore indications of the instantaneous X and Y positions of the carriage and crossfeed, are provided by the readouts 26 and 27.

The traverse of the tracer beam along the joint J in response to the recorded information is next observed to assure that the beam at full welding power will faithfully follow the center line of the track. Assuming that this is satisfactorily demonstrated by the programmed tracer beam traverse, the playback is again set for retracing the track, this time with the full beam power for welding. Thus, on the re-traverse at full power, the weld path is completed under full control of the recorded information.

The record and playback circuitry disclosed in the drawings may be of any form suitable for the purpose. In the form shown, all of the elements disclosed are commercially available. For example, the X and Y motors 17 and 19 are commercially available "Slo-Syn" motors such as supplied by Herbach and Rademan, Inc., of Philadelphia, Pa., and the motor controls 24 and 25 are so called "Translators," available from the same source, which serve to convert low-level signal pulses or square waves into the correct four-step switching sequence needed to drive the "Slo-Syn" motors at 200 discrete steps per revolution. The X and Y rotary digitizers 20 and 21 are available commercially as so called "Optisyns" manufactured by the Dynamics Research Corporation of Stoneham, Mass. The readouts 22, 23, 26 and 27 are all similar and are commercially available pulse counters-position indicators of well known characteristics.

All of the current electron beam welding guns using DC filaments are affected by internal magnetic fields which tend to pull the beam slightly as they are being focused. On the Brad Thompson and Sciaky guns, this effect is lessened somewhat by supplied "beam alignment coils," which are electrically adjusted to minimize beam movement during focusing. However, it is almost impossible to completely eliminate this movement, which means that if the focus control is moved either accidentally or on purpose after locating the beam to the weld line, the beam could be misaligned when the weld is made. By using the tracer method of locating and focusing, the risk of missing the joint is eliminated, and repeatability, from operator to operator, is vastly improved. Early tests, using prior art methods, indicated that accurate focus required a high degree of skill, and rarely was precisely repeated by three different operators. Based on those experiences, and to avoid the human error, the focus for a given weld schedule was developed and recorded by focus current and the digital setting of a ten-turn potentiometer. Now, using the tracer technique, the elements of skill and judgment are less essential. At the energy level of the tracer beam, when the beam is defocused, it disappears completely.

Use of the tracer beam has provided a valuable insight into the causes of electron gun instability. For example, at 45 kv., the beam current, when used as the tracer beam, is very steady, and since the work surface is not brought to a melting temperature, no vapor deposition (and no outgassing) occurs. The beam current is controlled by reduction of the filament temperature (or current). As the filament current is raised, at about 10 to 12 ma. of beam current, the gun arcs out. From this point up to the knee of the curve, the beam current (and the gun) is very unstable, and arc outs occur frequently. This indicates that the vapor cloud must envelope the electron source (filament and cathode cup) of the gun, shorting between anode and cathode. In addition, since the moving gun is usually within four inches of the weld surface, it is subjected directly to the heat and gas released by the process, all of which raise the pressure in the local area of the gun itself. There is also evidence to support the theory that positive ions are released as the result of the collision of the electron stream (negatively charged particles) impingement on the surface. If so, these positive ions would be electrically attracted to the negatively-charged filament at high speed. It appears that the solution to this problem would be to enclose the gun and reduce the size of the beam exit aperture, so that a diffusion pump could be directly attached to the gun, maintaining a pressure differential in respect to the welding chamber, and blocking (or at least minimizing) the open path back through the gun. This is probably why the new "partial pressure E.B. welding systems" are gaining in popularity. It also will result in lower cost pumping systems, because large diffusion pumps and the costly valving systems are no longer required, since the chamber only needs to be in the low micron range of pressures (up to 100 microns). While today's partial pressure systems are designed for a stationary gun, it is believed that a 2" diffusion pump with open foreline could be used, if a remote controlled heating system were devised, so that the pump could be heated while roughing the chamber.

From the foregoing, it should now be apparent that a tracer beam method has been disclosed which is well adapted to fulfill the aforestated objects of the invention, and while only a few examples of the invention have been disclosed, it will be apparent that the same may be embodied in other forms or carried out in other ways without departing from the spirit or essential characteristics thereof. The present embodiment of the invention is therefore to be considered in all respects as illustrative and not restrictive, the scope of the invention being indicated by the appended claims, and all changes coming within the meaning and range of equivalency of the claims are intended to be embraced therein.

Having thus described the invention, what is claimed as new and useful and desired to be secured by Letters Patent is:

1. The method of proofing a weld path on a workpiece preparatory to making an actual welding traverse with an electron beam which comprises:

maintaining a constant beam voltage while setting the filament current of an electron gun which generates said beam at an energy value so low that, with the beam focused to produce a fine, barely visible pinpoint of light on the surface of the workpiece, the focused beam does not mark such surface, focusing such low energy beam on such surface, tracing the focused low energy beam along a selected weld path while making such corrections in the weld path as are indicated by such tracing, increasing the filament current thereby to increase electron emission to welding power while maintaining said constant beam voltage, and making the actual welding pass to include such corrections.

2. The tracer beam method as in claim 1 and comprising the further steps of detecting any deflection of the tracer beam from the weld path indicative of the presence of spurious magnetic fields, and removing the cause of such deflection.

3. The tracer beam method as in claim 1 and comprising the additional step of monitoring the filament current continuously during the tracer beam traverse to prevent a beam current increase capable of melting the surface of the workpiece.

References Cited

UNITED STATES PATENTS

| | | | |
|---|---|---|---|
| 3,146,335 | 8/1964 | Samuelson | 219—121 |
| 3,152,238 | 10/1964 | Anderson | 219—121 |
| 3,156,810 | 11/1964 | Samuelson | 219—131 |
| 3,165,619 | 1/1965 | Cohen | 219—121 |
| 3,196,246 | 7/1965 | El-Kareh | 219—121 |
| 3,221,133 | 11/1965 | Kazato et al. | 219—121 |
| 3,257,555 | 6/1966 | Klebba | 219—121 |
| 3,267,250 | 8/1966 | Ullery | 219—121 |
| 3,283,120 | 11/1966 | Spruck | 219—121 |
| 3,383,492 | 5/1968 | Solomon | 219—121 |
| 3,408,474 | 10/1968 | Downing | 219—121 |
| 2,996,348 | 8/1961 | Rosenberg | 346—33 |
| 2,365,365 | 12/1944 | Trinkle | 90—13.5 |
| 3,301,949 | 1/1967 | Ullery | 219—121 |
| 3,382,328 | 5/1968 | Gerard | 219—121 |
| 3,449,542 | 6/1969 | Conner et al. | 219—121 |

JOSEPH V. TRUHE, Primary Examiner

U.S. Cl. X.R.

219—124